(12) United States Patent
Yoshiya et al.

(10) Patent No.: US 12,188,790 B2
(45) Date of Patent: Jan. 7, 2025

(54) SENSOR ASSEMBLY WITH A JOYSTICK OR A THUMBSTICK

(71) Applicant: Melexis Technologies SA, Bevaix (CH)

(72) Inventors: Takumi Yoshiya, Yokohama (JP); Hiroyuki Takahashi, Yokohama (JP)

(73) Assignee: MELEXIS TECHNOLOGIES SA, Bevaix (CH)

( * ) Notice: Subject to any disclaimer, the term of this patent is extended or adjusted under 35 U.S.C. 154(b) by 150 days.

(21) Appl. No.: 18/076,026

(22) Filed: Dec. 6, 2022

(65) Prior Publication Data
US 2023/0184565 A1 Jun. 15, 2023

(30) Foreign Application Priority Data
Dec. 10, 2021 (EP) .................................... 21213625

(51) Int. Cl.
*G01D 5/14* (2006.01)
*G05G 9/047* (2006.01)
(52) U.S. Cl.
CPC ............. *G01D 5/145* (2013.01); *G05G 9/047* (2013.01); *G05G 2009/04755* (2013.01)
(58) Field of Classification Search
None
See application file for complete search history.

(56) References Cited

U.S. PATENT DOCUMENTS

| | | | | |
|---|---|---|---|---|
| 8,717,010 | B2 * | 5/2014 | Ausserlechner | G01R 33/022 324/179 |
| 10,048,091 | B1 * | 8/2018 | Ortner | G06F 3/0346 |
| 2002/0021124 | A1 * | 2/2002 | Schott | G01D 5/145 324/207.2 |
| 2007/0262959 | A1 * | 11/2007 | Gu | G05G 9/047 345/161 |
| 2008/0258722 | A1 | 10/2008 | Zon et al. | |
| 2012/0025809 | A1 * | 2/2012 | Banerjee | G05G 7/02 324/207.13 |
| 2015/0377648 | A1 | 12/2015 | Sirohiwala et al. | |
| 2016/0334830 | A1 * | 11/2016 | Sirohiwala | G01D 5/145 |
| 2019/0179357 | A1 | 6/2019 | Sirohiwala et al. | |
| 2020/0089334 | A1 | 3/2020 | Tompkins et al. | |
| 2021/0180988 | A1 * | 6/2021 | Leisenheimer | G01B 7/30 |

OTHER PUBLICATIONS

Extended Search Report from European Application No. 21213625. 3, May 13, 2022.

* cited by examiner

*Primary Examiner* — Jas A Sanghera
(74) *Attorney, Agent, or Firm* — Workman Nydegger

(57) ABSTRACT

A sensor assembly includes a magnetic source for generating a magnetic field; a lever or stick, which can be manually tilted about a reference orientation; a magnetic sensor device for measuring the magnetic field. The magnetic source forms a central opening. The stick includes a ferromagnetic object mounted such that a potential energy of the magnetic field is minimal when the stick is oriented in the reference orientation.

18 Claims, 10 Drawing Sheets

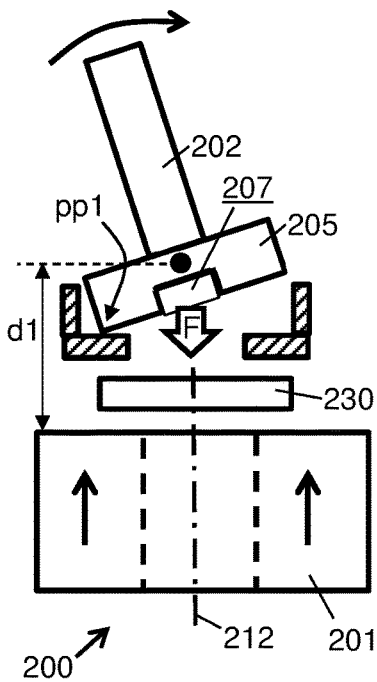 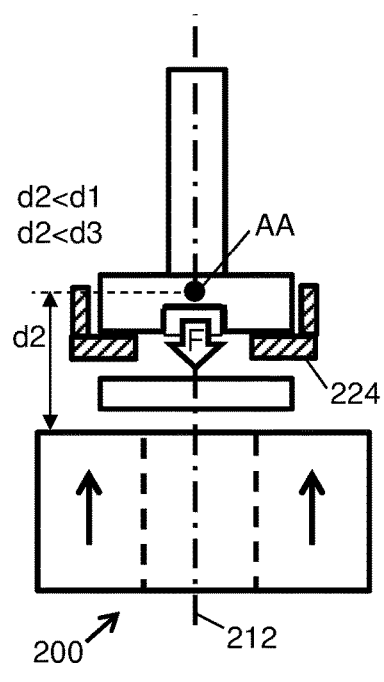 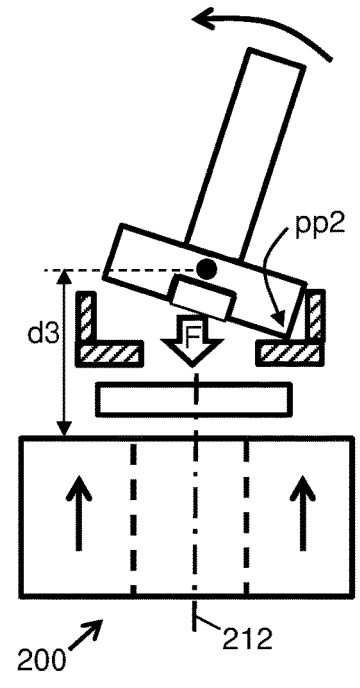
FIG. 2A   FIG. 2B   FIG. 2C
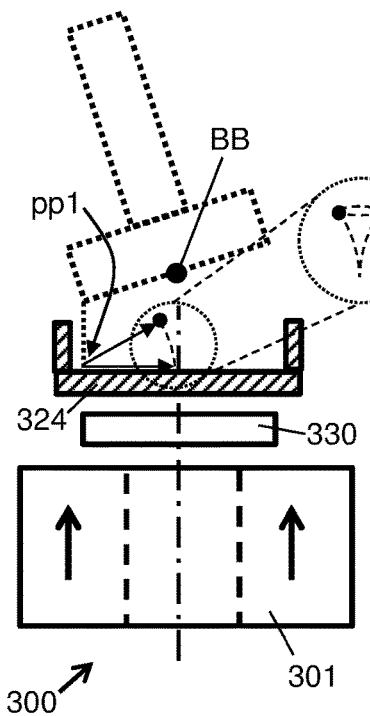 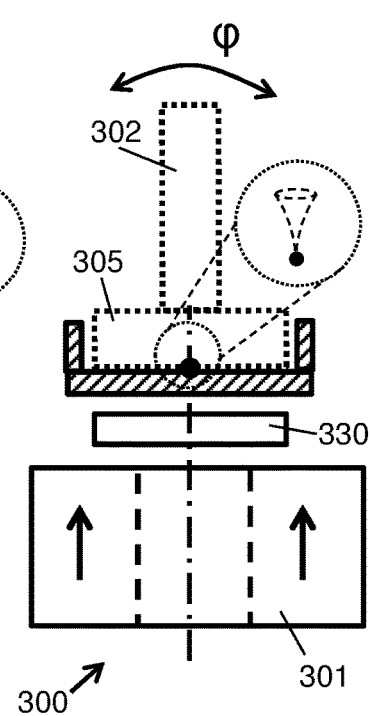 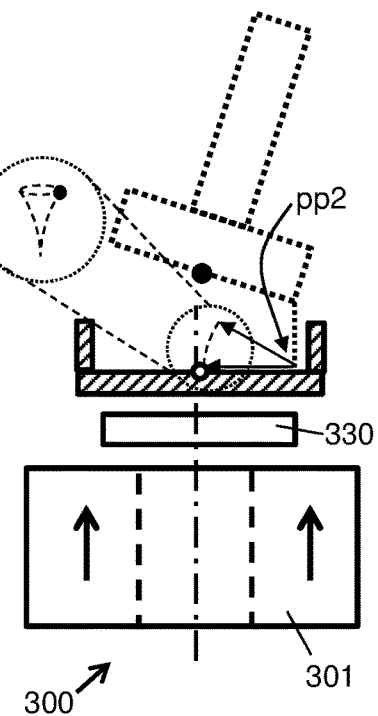
FIG. 3A   FIG. 3B   FIG. 3C

$gr1 = (dBx/dx) = Bx2-Bx1 = (h4-h3)-(h2-h1)$
$gr2 = (dBz/dx) = Bz2-Bz1 = (h4+h3)-(h2+h1)$
$gr3 = (dBy/dy) = By4-By3 = (h8-h7)-(h6-h5)$
$gr4 = (dBz/dy) = Bz4-Bz3 = (h8+h7)-(h6+h5)$ $$\begin{cases} \alpha = K1*\text{atan2}(gr2,gr1) \\ \beta = K2*\text{atan2}(gr4,gr3) \end{cases} \quad \text{or} \quad \begin{cases} \alpha = K1*\text{atan2}(K3*gr2,gr1) \\ \beta = K2*\text{atan2}(K4*gr4,gr3) \end{cases}$$

$gr1 = (dBx/dx) = Bx2 - Bx1 = (v2 - v1)$
$gr2 = (dBz/dx) = Bz2 - Bz1 = (h2 - h1)$
$gr3 = (dBy/dy) = By4 - By3 = (v4 - v3)$
$gr4 = (dBz/dy) = Bz4 - Bz3 = (h4 - h3)$ $$\begin{cases} \alpha = K1 * atan2(gr2, gr1) \\ \beta = K2 * atan2(gr4, gr3) \end{cases} \text{ or } \begin{cases} \alpha = K1 * atan2(K3 * gr2, gr1) \\ \beta = K2 * atan2(K4 * gr4, gr3) \end{cases}$$

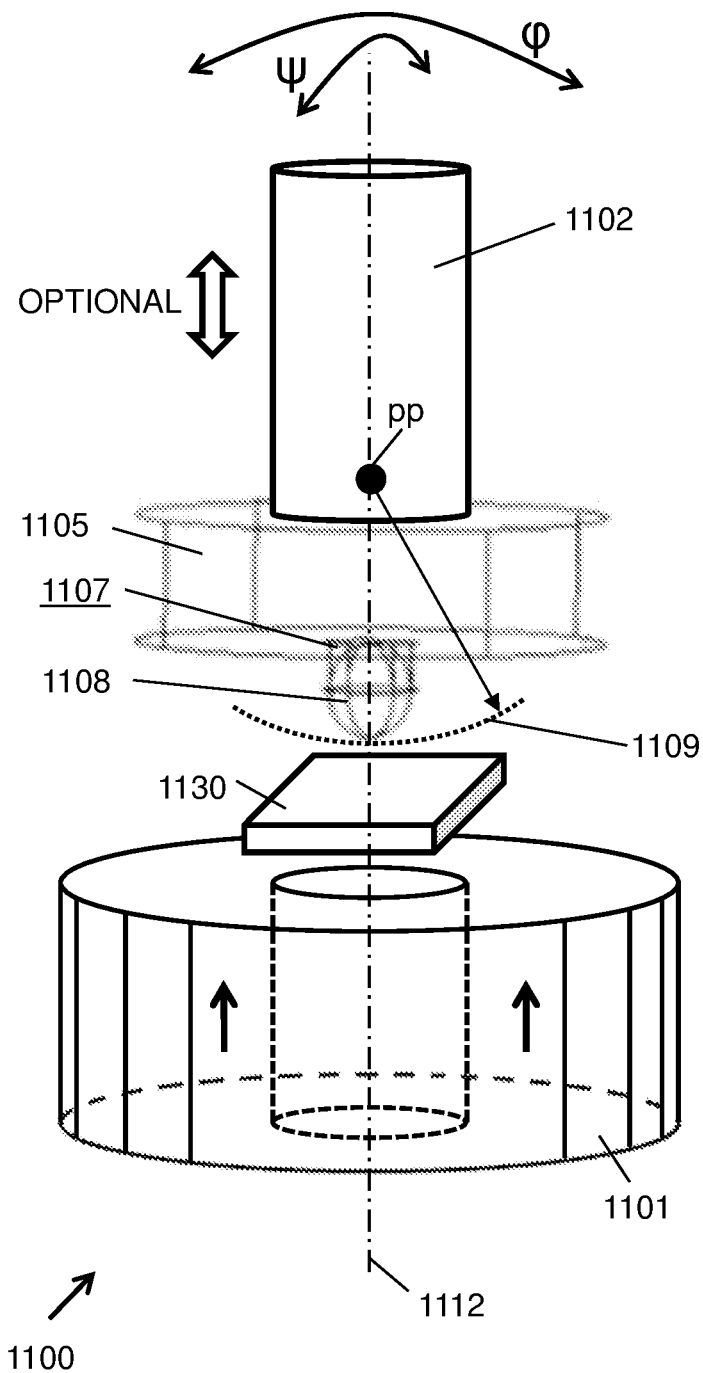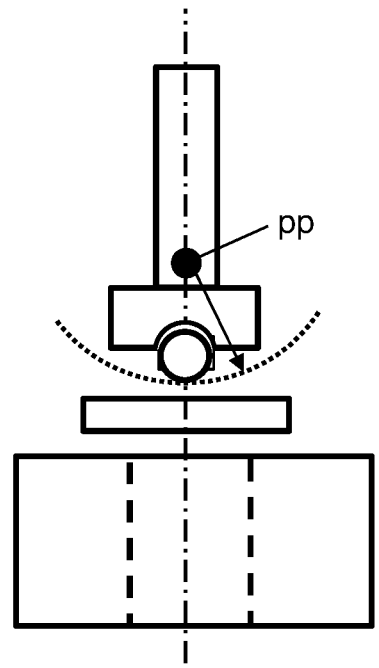
FIG. 11A
FIG. 11B

SENSOR ASSEMBLY WITH A JOYSTICK OR A THUMBSTICK

FIELD OF THE INVENTION

The present invention relates in general to the field of magnetic sensors, and more in particular to a sensor assembly for measuring an orientation of a joystick or a thumb stick which is pivotable.

BACKGROUND OF THE INVENTION

Joystick assemblies or thumb stick assemblies are known in the art, for example from US2019179357(A1) describing a joystick assembly including a first magnet with a North and a South magnetic Pole, and a second magnet with a North and a South magnetic Pole, and a sensor device located between the first and the second magnet. A first end of a shaft is coupled to the second magnet such that movement of the shaft results in movement of the second magnet relative to the first magnet. An attraction of the second magnet to the first magnet results in a restoring force upon the shaft.

A joystick assembly is also known from co-pending application EP21180417.4, filed on 18 Jun. 2021, describing a sensor system and methods for determining a position of a joystick in a manner which is highly robust against an external disturbance field.

There is always room for improvements or alternatives.

SUMMARY OF THE INVENTION

It is an object of embodiments of the present invention to provide a sensor assembly for determining an orientation of a lever or a handle or a stick, e.g. a joystick or a thumb stick.

It is an object of embodiments of the present invention to provide a sensor assembly for determining an orientation (e.g. in the form of a single angle) of the lever or handle or stick which can be tilted or is pivotable with 1 degree of freedom.

It is an object of embodiments of the present invention to provide a sensor assembly for determining an orientation (e.g. in the form of two angles) of the lever or handle or stick which can be tilted or is pivotable with 2 degree of freedom.

It is an object of embodiments of the present invention to provide a sensor assembly for determining an orientation (e.g. in the form of two angles) of the lever or handle or stick which can be tilted or is pivotable with 1 or 2 degrees of freedom, and for determining whether or not the lever or handle or stick is pressed (i.e. pushed down) or released.

It is an object of embodiments of the present invention to provide a sensor assembly having only a single magnet, while being capable of returning the stick to a neutral position when the stick is released.

In some embodiments, the assembly is provided for determining said orientation in a manner which is highly robust against an external disturbance field (also known as "strayfield").

These and other objectives are accomplished by embodiments of the present invention.

According to a first aspect, the present invention provides a sensor assembly comprising: a magnetic source for generating a magnetic field with circular symmetry or with rotational symmetry (e.g. of order 3 or 4 or 5 or 6 or 7 or 8) about a central axis defining a reference orientation (e.g. Z); a lever or a stick, e.g. joystick or thumb stick, which is mounted such that the lever or stick can be tilted (e.g. manually) with respect to said reference orientation (also referred to herein as "neutral orientation" or "neutral position"), the lever or stick comprising or being fixedly connected to a ferromagnetic object; a magnetic sensor device comprising a substrate with a plurality of magnetic sensors (e.g. a plurality of magnetic elements, e.g. arranged as a 3D magnetic pixel, or arranged as four 2D magnetic pixels) configured for providing sensor signals indicative of the magnetic field (generated by the magnetic source, and modified by the ferromagnetic object); wherein the magnetic sensor device is located between the magnetic source and the ferromagnetic object; and wherein the lever or stick is mounted in such a way that a potential energy of the magnetic field is minimal when the lever or stick is oriented in the reference orientation.

The lever or stick can also be referred to as a "handle".

The magnet or magnetic source exerts an attracting force on the ferromagnetic object. Due to the construction of the assembly, movements of the ferromagnetic object cause a tilt of the lever or stick. The present invention exploits the fact that the energy of the system is minimal when the ferromagnetic object is closest to the magnetic source, which corresponds to the stick or lever being oriented in the "reference orientation" (also referred to as "neutral orientation" or "neutral position").

Stated in simple terms, this sensor assembly may be referred to as a "joystick assembly with a pull-back force to the neutral position".

In preferred embodiments, the assembly comprises only a single magnet.

Preferably, the potential energy increases (e.g. strict monotonically) when the ferromagnetic object is tilted away from the reference orientation.

Optionally, the assembly may furthermore provide a "push button" functionality.

This position sensor assembly may also be referred to as a "joystick assembly" if the stick is a joystick, or a "thumb stick assembly" if the stick is a thumb stick.

In preferred embodiments, the stick or lever has an elongated axis. Preferably this axis coincides with a central axis of the magnet.

In an embodiment, the magnetic source is an axially magnetized magnet with a through-opening oriented in the axial direction.

The through opening may have a circular cross-section, or a regular polygon, e.g. an equilateral triangle, a square, a pentagon, or a hexagon, an octagon, etc.

The magnet may be a two-pole ring magnet.

In an embodiment, the magnetic source is an axially magnetized ring magnet with a cylindrical through-opening.

In an embodiment, the magnetic source comprises a plurality of individual two-pole magnets, oriented in parallel, and arranged so as to form an opening between them.

In another embodiment, the magnetic source comprises at least two or at least three or at least four magnetic elements, forming a central opening between them.

In an embodiment, the magnetic source comprises a plurality of bar magnets or beam-shaped magnets, for example three or four or five or six or eight two-pole magnets.

In an embodiment, the magnetic sensor device is situated such that its sensor elements are located substantially on the central axis of the magnetic source, and at an axial position (e.g. zA) where the axial magnetic field component (e.g. Bz) is equal to zero, or at a distance (e.g. ε) smaller than 1.0 mm, or smaller than 0.8 mm, or smaller than 0.5 mm from that axial position.

It is an advantage of such an assembly that the magnetic field component Bz measured by the sensor device is approximately equal to zero when the magnet is in the neutral position. This allows the tilt angle(s) to be calculated in a simple manner, using a simple formula, over a relatively large tilting range (at least ±15°, or at least ±20°, or at least ±25°), with good accuracy.

In an embodiment, the ferromagnetic object comprises, or is made of iron.

In an embodiment, the ferromagnetic object has a shape with circular symmetry or with rotational symmetry with respect to a symmetry axis. In preferred embodiments, this symmetry axis of the ferromagnetic object coincides with the longitudinal axis of the lever or stick, but that is not absolutely required. Preferably, the axis of rotational symmetry of the ferromagnetic object coincides with the axis of rotational symmetry of the magnet in the "neutral position" of the ferromagnetic object, and these axes form a non-zero-angle in a "tilted" position of the ferromagnetic object.

In an embodiment, the ferromagnetic object has a prism shape or cubical shape, with a square cross-section in a plane perpendicular to the lever or stick.

In an embodiment, the ferromagnetic object has a circular symmetrical shape with respect to the axis of the lever or stick.

In an embodiment, the ferromagnetic object has an overall cylindrical shape.

The overall cylindrical shape may furthermore have an axially extending rim or flange, extending in the direction of the magnetic source.

Preferably, the radial size (e.g. outer diameter, or diagonal of an outer perimeter) of the ferromagnetic object is smaller than the radial size (e.g. outer diameter, or diagonal of an outer perimeter) of the magnetic source. For example, if the ferromagnetic object has a cylindrical shape or comprises a cylindrical or spherical or semi-spherical protrusion, and if the magnet is a ring magnet, then the outer diameter of the cylindrical or spherical or semi-spherical shape is preferably smaller than an outer diameter of the ring magnet.

In an embodiment, the ferromagnetic object has a cavity facing the magnetic source.

In an embodiment, the ferromagnetic object has a shape with a ferromagnetic protrusion extending toward the magnetic source.

Examples are shown in FIG. 11A to FIG. 14. The "ferromagnetic protrusion" may be connected to a larger object, e.g. to a cylindrical object or a cubical object, the latter being ferromagnetic or non-ferromagnetic, for example made from plastic or aluminium. The shape of the ferromagnetic object or of the ferromagnetic protrusion is preferably rounded, e.g. semi-spherical, but that is not absolutely required.

In an embodiment, the lever or stick, e.g. joystick has a tilt range spanning at least the range from −25° to +25° about the neutral position in one plane (in case of 1 degree of freedom), or in two orthogonal planes (in case of 2 degrees of freedom).

In an embodiment, the assembly further comprises a housing or a holding mechanism (e.g. a mechanism with one or more brackets) providing the movable mounting of the stick and the ferromagnetic object relative to the magnetic source.

In an embodiment, the housing or holding mechanism has a protrusion, and the ferromagnetic object has a cavity or an opening for at least partially receiving said protrusion, or vice versa.

The protrusion may be implemented as a plastic or aluminium boss.

In an embodiment, the ferromagnetic object has a convex shape comprising a rim or flange configured for resting on a portion of the housing or holding mechanism.

In an embodiment, the ferromagnetic object has a concave shape.

In an embodiment, the ferromagnetic object has a shape with a peripheral flange directed towards the magnetic source; and wherein the housing or holding mechanism further comprises contact surface portion for supporting said peripheral flange. The contact surface may be ring shaped.

When the stick is in its reference orientation, the peripheral flange of the ferromagnetic object can contact said surface at multiple locations (e.g. at the entire periphery), and the pivot point may be closest to the magnetic source. When the stick is manually tilted with respect to the reference orientation, the ferromagnetic object may contact said support surface only on one side, such that the axial position of the pivot point is further away from the magnetic source.

Or stated in simple terms, the ferromagnetic object is closest to the magnetic source when it is oriented in the reference orientation, and the peripheral flange (or rim) would typically rest on the ring-shaped planar surface in this position. In this position, the position energy is minimal.

When the ferromagnetic object is tilted over an angle with respect to the reference position, the ferromagnetic object contacts the ring-shaped surface at one location but does not contact the ring-shaped surface at another location. In this position, the potential energy is not minimal.

In an embodiment, the ferromagnetic object is pivotable about a (real or imaginary) pivot point.

The pivot point may have a fixed position relative to the magnetic source.

In an embodiment, the pivot point can be pressed towards or away from the magnetic source, e.g. in a direction substantially parallel to the reference axis of the magnet.

In an embodiment, the ferromagnetic object has a cavity for accommodating a ferromagnetic ball, and the housing or holding mechanism further comprises a non-planar surface (e.g. spherical or egg-shaped or parabolic surface) for supporting said ball, and thus also said ferromagnetic object and the stick.

Preferably the non-planar surface is shaped such that a distance between the magnetic source and the non-planar surface is smallest at an intersection of the reference axis and the non-planar surface. Or stated in "simple terms": wherein a "lowest location" of the surface, closest to the magnet, is a location where the reference orientation (or reference axis) intersects that surface.

In an embodiment, the ferromagnetic object has a spherical or semi-spherical shape or protrusion.

In an embodiment, the housing or holding mechanism comprises a first housing portion which is fixed relative to the magnetic source, and a second housing portion which is movable relative to the magnetic source, e.g. between a first axial position and a second axial position.

The sensor device may be further configured for determining whether the pivot point is in said first or a second axial position.

In an embodiment, the push detection only needs to work when the stick is in its neutral orientation. In another embodiment, the push detection also works when the stick is tilted.

In an embodiment, the push-down stroke is a value in the range from 0.2 to 2.0 mm, or in the range from 0.2 to 1.0 mm.

In an embodiment, the second housing portion is movable relative to the magnetic source by means of a spring or a membrane, and/or by means of a plurality of guide pens.

The spring may be a membrane spring or a disc spring or a platter spring, made from a nonmagnetic material. Thus, the stick is pushed back in the axial direction (Z) by means of this spring or membrane. In contrast, the force to push (rotate) the stick back to the neutral orientation is magnetic. For any position of the pivot point, the potential energy (with respect to the rotation) is lowest in the neutral orientation.

The sensor device may be further configured for determining whether the surface is in said first or a second height position, (directly or indirectly).

In an embodiment, the sensor device is configured for determining two or three magnetic field components (e.g. Bx, By, Bz) oriented in three orthogonal directions, and for determining one or two tilt angles (e.g. α, β) based on these magnetic field components. The meaning of the angles may be as shown in FIG. 1, or as shown in FIG. 15. These magnetic field components may be measured at a single sensor situated on the central axis of the magnet.

In an embodiment, the sensor device is configured for determining at least two magnetic field components (e.g. Bx, By, Bz) oriented in at least two orthogonal directions, and for determining at least one tilt angle (e.g. α) based on these magnetic field components.

In an embodiment, the sensor device is configured for determining at least three magnetic field components (e.g. Bx, By, Bz) oriented in three orthogonal directions, and for determining one or two tilt angles (e.g. α, β) based on these magnetic field components.

In an embodiment, the sensor device has a sensor structure configured for determining two or three magnetic field components (e.g. Bx, By, Bz) oriented in three orthogonal directions, and has a processing circuit configured for determining one or two tilt angles (e.g. α, β) based on these magnetic field components.

In an embodiment, the sensor device is configured for determining two or four magnetic field gradients (e.g. dBx/dx, dBy/dy, dBz/dx, dBz/dy) oriented in different directions, and for determining one or two tilt angles (e.g. α, β) based on these magnetic field gradients.

In an embodiment, the sensor device has a sensor structure configured for determining two or four magnetic field gradients (e.g. dBx/dx, dBy/dy, dBz/dx, dBz/dy) oriented in different directions, and has a processing circuit configured for determining one or two tilt angles (e.g. α, β) based on these magnetic field gradients.

With "determining axial position" is meant determining whether the stick (e.g. joystick or thumb stick) is pushed or not.

In an embodiment, the sensor device comprises at least one horizontal Hall element for measuring a first magnetic field component (e.g. Bz) in a first direction (e.g. Z) parallel to the reference orientation, and comprises at least one vertical Hall elements for measuring a second magnetic field component (e.g. Bx) oriented in a second direction perpendicular to the first direction (e.g. Z), and optionally comprises at least one vertical Hall element for measuring a third magnetic field component (e.g. By) oriented in a third direction perpendicular to the first (e.g. Z) and the second direction (e.g. X).

In an embodiment, the sensor device comprises an integrated magnetic flux concentrator (IMC) having a circular shape, and at least two horizontal Hall elements located near a periphery of the IMC and angularly spaced by 180°, or at least three horizontal Hall elements located near a periphery of the IMC and angularly spaced by multiples of 120°, or at least four horizontal Hall elements located near a periphery of the IMC and angularly spaced by multiples of 90°.

In an embodiment, the plurality of magnetic sensors comprises a first sensor (e.g. S1), a second sensor (e.g. S2), a third sensor (e.g. S3) and a fourth sensor (e.g. S4), the first sensor being located at a first sensor location and the second sensor being located at a second sensor location, situated on a first virtual line oriented in the first direction (e.g. X), and spaced apart from each other by a first distance, the first sensor (e.g. S1) being configured for measuring a first magnetic field component (e.g. Bx1) oriented in the first direction (e.g. X) and a second magnetic field component (e.g. Bz1) oriented in the third direction (e.g. Z), the second sensor (e.g. S2) being configured for measuring a third magnetic field component (e.g. Bx2) oriented in the first direction (e.g. X) and a fourth magnetic field component (e.g. Bz2) oriented in the third direction (e.g. Z), the third sensor (e.g. S3) being located at a third sensor location and the fourth sensor (e.g. S4) being located at a fourth sensor location, situated on a second virtual line oriented in the second direction (Y), and spaced apart from each other by a second distance, the third sensor (e.g. S3) being configured for measuring a fifth magnetic field component (e.g. By3) oriented in the second direction (Y) and a sixth magnetic field component (e.g. Bz3) oriented in the third direction (e.g. Z), the fourth sensor (e.g. S4) being configured for measuring a seventh magnetic field component (e.g. By4) oriented in the second direction (e.g. Y) and an eighth magnetic field component (e.g. Bz4) oriented in the third direction (e.g. Z).

Using such configuration, the first magnetic field gradient (dBx/dx) may be based on a difference between the first (Bx1) and the third (Bx2) magnetic field component; the second magnetic field gradient (dBz/dx) may be based on a difference between the second (Bz1) and the fourth (Bz2) magnetic field component; the third magnetic field gradient (dBy/dy) may be based on a difference between the fifth (By1) and the seventh (By2) magnetic field component; and the fourth magnetic field gradient (dBz/dy) may be based on a difference between the sixth (Bz3) and the eighth (Bz4) magnetic field component.

In an embodiment, the sensor device is configured for measuring and outputting the measured values, for allowing an external processor to calculate the orientation.

In an embodiment, the sensor device further comprises a processing circuit, e.g. a programmable processor, configured for determining a first angle (α) and optionally also a second angle (β) indicative of the orientation of the stick, based on the sensor signals.

In an embodiment, the sensor device is configured for determining a first angle (e.g. α) using a function (e.g. an arctangent function) of a ratio of the first magnetic field component (e.g. Bz) and the second magnetic field component (e.g. By), or wherein the sensor device is configured for determining a first angle (e.g. α) using an arctangent function of a ratio of the first magnetic field gradient (e.g. dBz/dx) and the second magnetic field gradient (e.g. dBy/dx); and optionally wherein the sensor device is further configured for determining a second angle (e.g. β) using a function (e.g. an arctangent function) of a ratio of the first magnetic field component (e.g. Bz) and the third magnetic field component (e.g. Bx), or wherein the sensor device is configured for determining a second angle (e.g. β) using an arctangent function of a ratio of the third magnetic field gradient (e.g. dBz/dy) and the fourth magnetic field gradient (e.g. dBy/dy).

In an embodiment, the sensor device is configured for determining a first angle (e.g. α) using a function of a ratio of the first magnetic field component (e.g. Bz) and the second magnetic field component (e.g. By), and optionally wherein the sensor device is further configured for determining a second angle (e.g. β) using a function of a ratio of the first magnetic field component (e.g. Bz) and the third magnetic field component (e.g. Bx).

In an embodiment, the sensor device is configured for determining a first angle (e.g. α) using an arctangent function of a ratio of the first magnetic field gradient (e.g. dBz/dx) and the second magnetic field gradient (e.g. dBy/dx), and optionally wherein the sensor device is configured for determining a second angle (e.g. β) using an arctangent function of a ratio of the third magnetic field gradient (e.g. dB z/dy) and the fourth magnetic field gradient (e.g. dB y/dy).

In an embodiment, the sensor device is further configured for determining a sum of squares of the at least two or at least three magnetic field components, and for comparing this sum, or a value derived therefrom (e.g. a square root of that sum) with a predefined threshold; and for determining that the stick) is pushed or pressed when the sum or the value derived therefrom is larger than said threshold, and for determining that the stick is released when the sum or the value derived therefrom is smaller than said threshold.

The magnetic source may be a ring magnet. The height of the ring magnet may be equal to, or larger than the inner diameter. The height of the ring magnet is preferably smaller than the outer diameter of the ring magnet.

In an embodiment, the magnetic source is a ring magnet having an outer diameter (e.g. Do) in the range from 8 to 12 mm (e.g. equal to about 10 mm), an inner diameter (e.g. Di) in the range from 2.0 to 5.0 mm (e.g. equal to about 3 mm), and a height (e.g. H) of about 3.0 to about 5.0 mm (e.g. equal to about 4 mm).

In an embodiment, the sensor device comprises a semiconductor substrate, which is situated at a distance (e.g. d5) in the range from 0.2 mm to 0.8 mm from the ring magnet.

Particular and preferred aspects of the invention are set out in the accompanying independent and dependent claims. Features from the dependent claims may be combined with features of the independent claims and with features of other dependent claims as appropriate and not merely as explicitly set out in the claims. These and other aspects of the invention will be apparent from and elucidated with reference to the embodiment(s) described hereinafter.

BRIEF DESCRIPTION OF THE DRAWINGS

FIG. 2A to FIG. 2C are simplified schematic representations of a variant of the joystick assembly of FIG. 1, according to another embodiment of the present invention. The joystick of these embodiments can be tilted about a reference axis, but a vertical displacement (pushed or released) is not detected. The ferromagnetic object has a cavity facing the magnet.

FIG. 3A to FIG. 3C show a variant of the joystick assembly of FIG. 2A to FIG. 2C. The ferromagnetic object has a flat or planar bottom surface facing the magnet. These figures also illustrate possible locations of a central point of the bottom surface. This point is located closest to the magnet in FIG. 3B.

FIG. 11A shows an example of another joystick assembly according to an embodiment of the present invention in perspective view, and FIG. 11B in side view. This assembly can be seen as a variant of the assembly of FIG. 1, or as a variant of the assembly of FIG. 2A to FIG. 2C, or as a variant of the assembly of FIG. 3A to FIG. 3C. In the assembly of FIG. 11A and FIG. 11B, the joystick can pivot about a pivot point PP.

DETAILED DESCRIPTION OF ILLUSTRATIVE EMBODIMENTS

Figure 1:
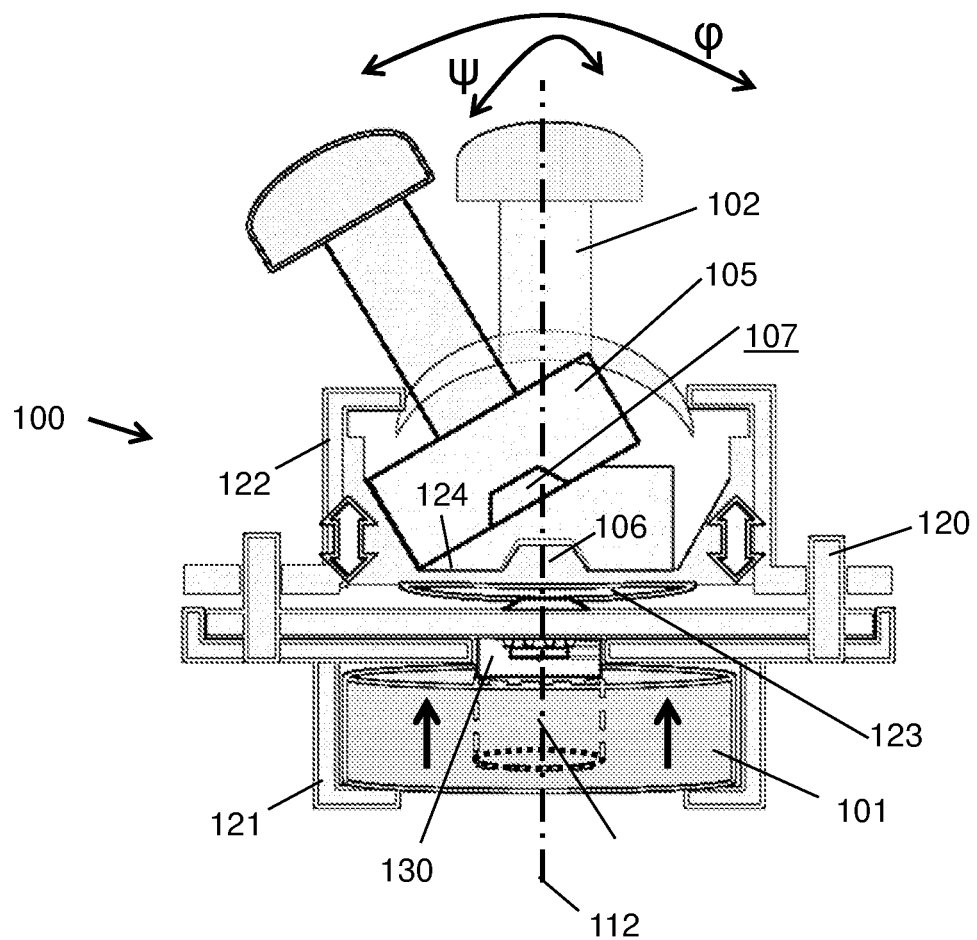
FIG. 1 is a schematic representation of an illustrative example of a joystick assembly according to an embodiment of the present invention. This assembly comprises a housing with a single ring magnet, a magnetic sensor device, a ferromagnetic object which is movable inside the housing, and a joystick connected to the ferromagnetic object. The joystick of this assembly has three degrees of freedom (tilting in two orthogonal directions, and up-down). The position and orientation of the joystick can be expressed by two angles and a height value.

The present invention will be described with respect to particular embodiments and with reference to certain drawings, but the invention is not limited thereto but only by the claims.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

The terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some, but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In this document, unless explicitly mentioned otherwise, the term "magnetic sensor device" or "sensor device" refers to a device comprising at least one "magnetic sensor" or at least one magnetic "sensor element", preferably integrated in a semiconductor substrate. The sensor device may be comprised in a package, also called "chip", although that is not absolutely required.

In this document, the term "sensor element" or "magnetic sensor element" or "magnetic sensor" can refer to a component or a group of components or a sub-circuit or a structure capable of measuring a magnetic quantity, such as for example a magneto-resistive (MR) element, a GMR element, an XMR element, a horizontal Hall plate, a vertical Hall plate, a Wheatstone-bridge containing at least one (but preferably four) magneto-resistive elements, etc. or combinations hereof.

In certain embodiments of the present invention, the term "magnetic sensor" or "magnetic sensor structure" may refer to an arrangement comprising one or more integrated magnetic concentrators (IMC), also known as integrated flux concentrators, and one or more horizontal Hall elements arranged near the periphery of the IMC, for example a disk shaped IMC with two horizontal Hall elements 180° spaced from each other, or with four horizontal Hall elements 90° spaced from each other.

In this document, the expression "in-plane component of a magnetic field vector" and "projection of the magnetic field vector in the sensor plane" mean the same. If the sensor device is or comprises a semiconductor substrate, this also means a "magnetic field component parallel to the semiconductor plane". These components may be labelled Bx, By.

In this document, the expression "out-of-plane component of a vector" and "Z component of the vector" and "projection of the vector on an axis perpendicular to the sensor plane" mean the same. This component may be labelled Bz.

Embodiments of the present invention are typically described using an orthogonal coordinate system which is fixed to the sensor device, and having three axes X, Y, Z, where the X and Y axis are parallel to the substrate, and the Z-axis is perpendicular to the substrate.

In this document, the expression "spatial derivative" or "derivative" or "spatial gradient" or "gradient" are used as synonyms. In the context of the present invention, the gradient is typically determined as a difference apart between two values measured at two locations spaced apart along a certain direction. In theory the gradient is typically calculated as the difference between two values divided by the distance between the sensor locations, but in practice the division by said distance is often omitted, because the measured signals need to be scaled anyway.

In this application, horizontal Hall plates are typically referred to by H1, H2, etc., signals from these horizontal Hall plates are typically referred to by h1, h2, etc., vertical Hall plates are typically referred to by V1, V2, etc., and signals from these vertical Hall plates are typically referred to by v1, v2, etc.

In the context of the present invention, the formulas arctan(x/y), atan2(x,y), arccot(y/x) are considered to be equivalent.

Known joystick assemblies (e.g. the joystick assembly described in US2019179357A1) may comprise two magnets and a sensor device located between these magnets. Other joystick assemblies, e.g. the joystick assembly described in EP patent application EP21180417.4 comprises a single magnet which is movable relative to a sensor device.

The present invention is related to a sensor assembly for measuring an orientation of a lever or a handle or a stick, e.g. a joystick or a thumb stick, further referred to as "stick", which can be (e.g. manually) tilted with respect to a reference orientation, or pivoted away from a reference orientation. When released, the stick is automatically oriented back in the reference orientation. In some embodiments, the stick can furthermore be pressed (i.e. pushed down), and when released, the stick is automatically pushed back (upwards).

In the sensor assemblies described below, the sensor device has a stationary position relative to a magnetic source. The position and/or orientation of the joystick can be determined by measuring characteristics of the magnetic field which is influenced by a movable ferromagnetic object comprised in or connected to the joystick.

Referring to the Figures.

FIG. 1 shows a sensor assembly 100 comprising a magnetic source 101 for generating a magnetic field. In the example of FIG. 1, the magnetic source is a single, axially magnetized ring magnet 101 having a cylindrical through-opening with a central axis 112, also referred to herein as "reference axis" 112, defining a "reference orientation".

The sensor assembly 100 further comprises a lever or a stick 102 (e.g. a joystick or a thumb stick) which is movably mounted to a housing or holder structure such that the lever or stick 102 can be (e.g. manually) tilted about a reference orientation (also referred to herein as "neutral orientation" or "neutral position"). In what follows, this lever or handle or stick 102 will further be referred to as "joystick", in order to keep the description simple.

Figure 15:
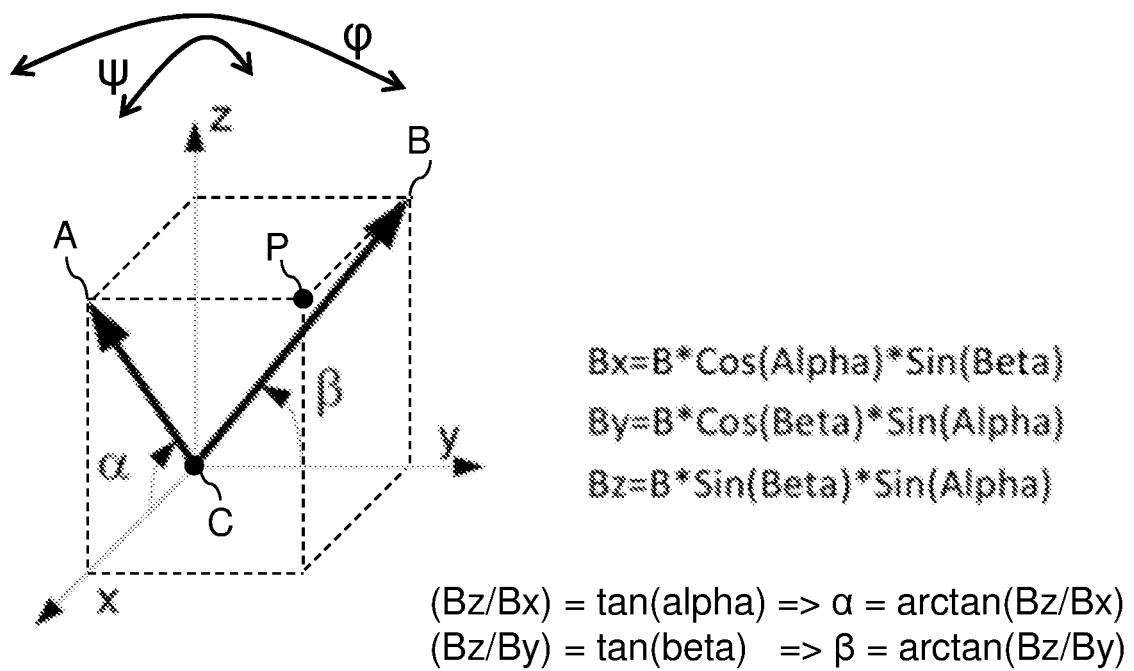
FIG. 15 shows how a random orientation of a line segment [CP] can be represented by two angles α and β. The drawings are only schematic and are non-limiting. In the drawings, the size of some of the elements may be exaggerated and not drawn on scale for illustrative purposes. Any reference signs in the claims shall not be construed as limiting the scope. In the different drawings, the same or similar reference signs (e.g. same modulo 100) may refer to the same or analogous elements.

The sensor assembly 100 further comprises a magnetic sensor device 130 comprising a semiconductor substrate with a plurality of magnetic sensors configured for providing sensor signals. The sensor device 130 may be configured for outputting these sensor signals, or signals derived therefrom (e.g. after digitization and/or scaling). The sensor device may further comprise a processing circuit configured for determining an orientation of the joystick, e.g. in the form of two angular values ($\varphi, \psi$) as illustrated in FIG. 1, or in the form of two angular values ($\alpha, \beta$) as illustrated in FIG. 15, and may be configured for outputting these angular values. Optionally, the sensor device may be further configured for determining whether the lever is being pushed or not (i.e. released), e.g. in the form of a Boolean or binary value.

The sensor assembly 100 further comprises a ferromagnetic object 105, fixedly connected to the joystick. In the example of FIG. 1, the ferromagnetic object 105 has the shape of a nut, but that is not absolutely required, and other shapes can also be used, e.g. a donut-shape, a cylindrical shape, a toroidal shape, a disk shape, etc. The purpose of the ferromagnetic object 105 is to bend the flux lines of the magnetic field generated by the magnetic source 101 when the joystick is moved (e.g. pivoted and/or pressed).

The sensor device 130 is situated between the magnetic source 101 and the ferromagnetic object 105. The sensor device 130 is preferably arranged relative to the magnetic source 101 such that the semiconductor substrate is located at a predefined distance d5 (see FIG. 4 and FIG. 5) from the magnetic source at which the magnetic field on the reference axis Z is substantially equal to zero, in the absence of the ferromagnetic object 105, as will be discussed further in FIG. 4 and FIG. 5. Or stated in other words, the magnetic sensor device 130 is preferably situated such that a center position of the sensor elements are located substantially on the central axis 112 of the magnet 101, and at an axial position ZA at which the axial magnetic field component Bz is equal to zero, or close to this position, e.g. deviating at most 1.0 mm from the position ZA in either direction, or deviating at most 0.5 mm from the position ZA. While this is not absolutely required for the invention to work, the mathematical formulas for determining the angular orientation of the stick may be simpler, and/or the formulas may provide an improved accuracy over a given range, and/or may provide an improved linearity over said range.

According to an important aspect of the present invention, the lever or stick 102 with the ferromagnetic object 105 is mounted such that a potential energy of the magnetic field is minimal when the stick 102 is oriented in the "reference orientation" defined by the magnetic source, e.g. parallel to the Z-axis, and increases when the stick 102 is tilted away from the reference orientation 112. In the embodiment of FIG. 1, the potential energy strict monotonically increases as the tilt angle $\varphi$ or $\psi$ increase.

The ferromagnetic object 105 may have a cavity 107, for receiving at least a portion of a protrusion 106 of the housing or holder structure. When present, the cavity and protrusion may help the stick to maintain a central position in the housing or in the holding structure, but this is not absolutely required for the invention to work, as will be illustrated further (see e.g. FIG. 3B, FIG. 11B, FIG. 12, FIG. 13).

In some embodiments of the present invention, the joystick 102 can tilt in two orthogonal directions, and the sensor device 130 is configured for determining (e.g. calculating) the orientation of the stick (e.g. as indicated by the angles $\varphi, \psi$) based on measurement of the magnetic field, e.g. as described FIG. 7 to FIG. 10.

In the embodiment of FIG. 1, the sensor device 130 can furthermore determine whether the stick 102 is pressed (i.e. pushed towards the magnet), but that is not required in all embodiments.

In the joystick assembly 100 shown in FIG. 1, the joystick 102 can tilt about the reference axis 112, but can also be pressed, e.g. when it is in the reference orientation. To this end, the housing may comprise two housing portions 121, 122 which are movable relative to one another. In the illustrative example of FIG. 1, the housing comprises a first housing portion 121, and a second housing portion 122 which is movable relative to the first housing portion 121 in the Z-direction (parallel to the reference orientation). Such movement can be established or facilitated in any known manner, e.g. by providing the first housing portion 121 with a plurality of guide pins 120 (two of which are visible in FIG. 1), and by providing the second housing portion 122 with a plurality of openings through which these guide pins can slide, or vice versa.

The housing may furthermore comprise a spring, e.g. a membrane spring 123 or a disk spring, or a spiral spring, configured to push the second housing portion 122 away from the first housing portion 121. When the stick 102 is in its neutral position (i.e. is oriented in the reference direction), and is manually pressed, the spring 123 is compressed, and the ferromagnetic object 105 is moved closer towards the magnetic source 101. The sensor device 130 can detect that the stick is being pressed by analysing the sensor signals, e.g. by calculating a sum of squares of the magnetic field components Bx, By, Bz, and by comparing this sum with a predefined threshold T1, and by determining that the stick is being pressed or not, depending on whether the sum is smaller or larger than the predefined threshold value T1. But other formulas may also be used, for example, by testing whether the value of the magnetic field component Bz oriented in the reference direction 112 is smaller or larger than a predefined threshold value T2, which may be a positive value or a negative value, depending on the implementation.

It is an advantage of the sensor assembly 100 of FIG. 1 that it can determine an orientation of the stick and provide a "restore force" or "push-back" force without requiring two magnets (cost advantage).

It is noted that the magnet 101 is magnetised in only one direction with respect to the reference orientation (e.g. in the direction of the positive Z-axis). For example, the magnetic source may have a North Pole at its top, and a South pole at its bottom (or vice versa). Yet, the stick 102 is automatically pulled back to its "reference orientation" parallel to the axis 112, by the magnetic force exerted by the magnetic source 101 on the ferromagnetic object 105.

The lever or stick may be mounted in any known manner, for example as shown in FIG. 2 on p 6/66 of the datasheet about ML90378 Triaxis® Position Processor, Revision 001, 28 Nov. 2018, publicly available on the internet at the time of filing this application, showing (on the left side of the picture) a "Ball and Socket Joystick" configuration and showing (on the right side of the picture) a so called "Gimbal Joystick" configuration, but other mounting techniques may also be used. In FIG. 1, the ferromagnetic portion rests or is supported by a surface portion 124 of the housing. This principle will be further illustrated in FIG. 2A to FIG. 3C.

These are the main principles of the present invention, and many different implementations using these principles are possible, some of which will be explained in more detail below.

FIG. 2A to FIG. 2C are simplified schematic representations of a sensor assembly 200 which can be seen as a variant of the sensor assembly 100 of FIG. 1. In the sensor assembly 200, the joystick 202 can be (e.g. manually) tilted about the reference axis 212, but cannot be moved up or down along the Z-axis, thus the housing 224 does not need to comprise two housing portions which are movable relative to each other. In FIG. 2, only a small portion of the housing is shown. The housing portion 224 is not ferromagnetic but may for example comprise plastic or aluminium.

The main purpose of FIG. 2A to FIG. 2C is to illustrate that an attraction force exerted between the magnet 201 and the ferromagnetic object 205 has a force component F that wants to bring the stick 202 back to the reference orientation. Indeed:

in FIG. 2A, the ferromagnetic object 205 rests on a housing portion on the left side of FIG. 2A, hence the attraction force F will want to rotate the stick 202 in clockwise direction, towards the reference axis 212;

in FIG. 2B, the ferromagnetic object rests on a housing portion 222 both on the left side and the right side of FIG. 2B, hence the attraction force F will try to maintain the orientation of the stick 202 parallel to the reference orientation 212;

in FIG. 2C, the ferromagnetic object 205 rests on a housing portion 222 on the right side of FIG. 2C, hence the attraction force F will want to rotate the stick 202 in counter-clockwise direction, towards the reference axis 212.

It can be understood that the potential energy of this magnetic system is minimal when the ferromagnetic object 205 is closest to the magnet 201, i.e. in FIG. 2B, because the distance d2 between the magnet 201 and a reference point AA (indicated by a black circle) of the ferromagnetic object 205 is smallest in FIG. 2B.

Even though the ferromagnetic object 205 of the joystick assembly 200 has a cavity 207, the housing 224 of the joystick assembly 200 does not have a protrusion. The cavity 207 may help to avoid an abrupt displacement when tilting the joystick out of the neutral position.

FIG. 3A to FIG. 3C show a joystick assembly 300 which can be seen as a variant of the joystick assembly 200 of FIG. 2A to FIG. 2C. The main difference being that the ferromagnetic object 305 has a flat or planar bottom surface that faces the magnet 301, without a cavity, and without a protrusion.

These figures also illustrate possible movements of a point BB which is situated at the centre of the bottom surface, as the joystick 302 is tilted. As shown in FIG. 3B, this location is at the bottom of a conical or cone-like shape, corresponding to the lowest potential energy. In FIG. 3A, the point BB is "moved away" against an attractive force exerted by the magnet (as compared to the position in FIG. 3B), thus this location on the cone corresponds to a higher potential energy. It can also be understood that for very small angles $\varphi$ and/or $\psi$, the movement of the point BB (at the tip of the cone) is vertically upwards, which illustrates that the pull-back force exists already for very small tilt angles.

It is noted that the joystick and the ferromagnetic object are shown slightly displaced upwards in FIG. 3A and FIG. 3C for illustrative purposes, namely to better show that the ferromagnetic object 305 rests at the point "pp1" in contact with the bottom portion 324, and that the point BB describes a circular arc when (for example) the tilt angle $\varphi$ changes from 0° (in the neutral position of FIG. 3B) to about 15° counter-clockwise (in FIG. 3A). Likewise, in FIG. 3C the ferromagnetic object 305 rests at the point "pp2" in contact with the bottom portion 324, and the point BB describes a circular arc when the tilt angle $\varphi$ changes from 0° (in the neutral position of FIG. 3B) to about 15° in clockwise direction (in FIG. 3C). The skilled person will understand that the point BB may take any location inside the "cone", depending on the tilt angles $\varphi$ and $\psi$, and that in any of these positions a magnetic force will be exerted upon the stick to pull it back to its "default position", i.e. to move the point BB towards the tip of the "cone" (FIG. 3B).

Figure 4:
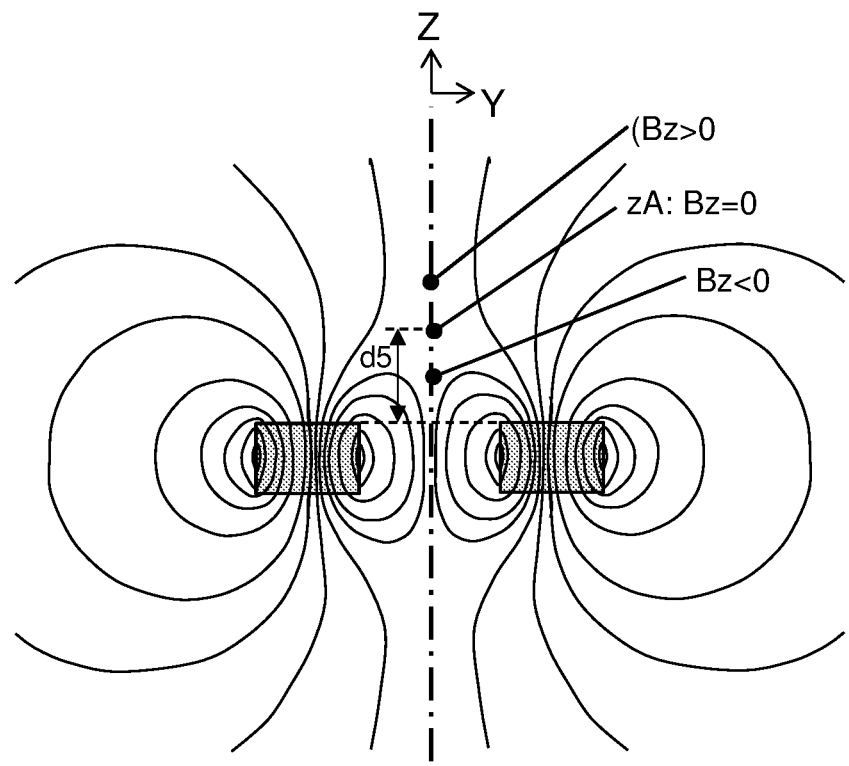
FIG. 4 shows an illustrative example of magnetic flux lines as may be generated by the ring magnet of FIG. 1, in the absence of the ferromagnetic object, in cross section, in a plane containing the central axis of the ring magnet.

FIG. 4 shows an illustrative example of magnetic flux lines as may be generated by an axially magnetized ring magnet, in the absence of any ferromagnetic objects, in cross section, in a plane containing the central axis Z of the ring magnet. The ring magnet of FIG. 4 has a rectangular cross section, but that is not absolutely required, and for example a rectangular cross-section with rounded edges will also work.

The main purpose of FIG. 4 is to show that the magnetic field generated by the magnet is substantially equal to zero at a predefined position "zA" along the central axis Z, at a predefined distance d5 from the magnet. This predefined distance d5 depends on the dimensions of the magnet (inner diameter, outer diameter, height), but once that a skilled person is told that such a position exists, this position can easily be found by simulation and/or by performing a simple experiment for a ring magnet with given dimensions.

As mentioned above, in preferred embodiments of the present invention, the sensor device (not shown in FIG. 4) is preferably arranged at a distance from the magnet such that the sensor elements of the sensor device are situated at this predefined distance. It is pointed out however, that the invention will still work if the sensor elements are not exactly located at this position. It was found that it suffices that the sensor elements are in close vicinity thereof, e.g. at a distance of at most 1.0 mm, or at a distance of at most 0.5 mm from the point zA.

Figure 5:
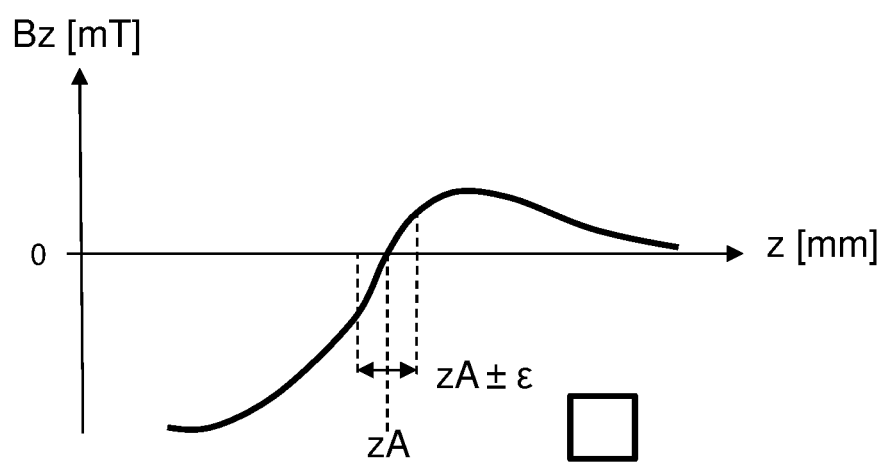
FIG. 5 shows an illustrative example of how the magnetic field component Bz oriented in the reference direction (Z) varies along the reference axis Z. As can be seen, the value of Bz is zero in a point "A" at a predefined distance from the magnet.

FIG. 5 shows an illustrative example of how the magnetic field component Bz oriented in the reference direction Z typically varies along the reference axis Z of the axially magnetized two-pole ring magnet. This is a qualitative graph. As can be seen, the value of Bz is zero when the z-coordinate is equal to zA, corresponding to the point "zA" of FIG. 4. Since By=0 and Bx=0 at all points along the Z-axis, this means that the magnitude |B| of the magnetic field generated by the magnet is zero at the location zA.

When a ferromagnetic object (not shown in FIG. 4) is brought in the vicinity of the magnetic source, the field lines of FIG. 4 will be disturbed. According to a principle of the present invention, the position of the ferromagnetic object, and hence the orientation of the stick, can be determined by measuring characteristics of the "disturbed magnetic field" at the sensor location.

Figure 6A:
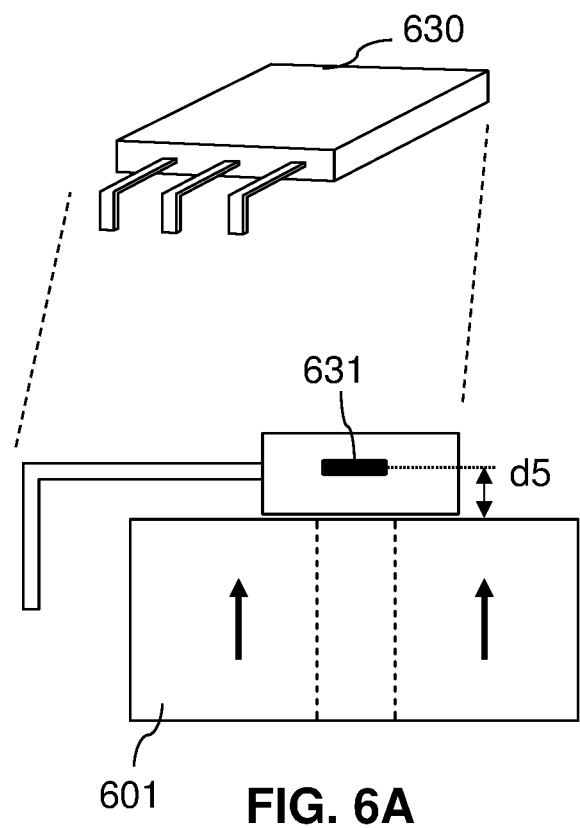
FIG. 6A shows an illustrative arrangement of a magnetic sensor device relative to ring magnet, as may be used in embodiments of the present invention.

FIG. 6A show an illustrative arrangement of a magnetic sensor device 630 relative to a magnet 601. In this example, the sensor device is a packaged semiconductor device which is mounted directly on top of the ring magnet 601. The sensor device 630 comprises a semiconductor substrate with an "active surface" which is preferably located substantially on the Z-axis, and at the above-described location zA, or at a distance of at most 1.0 mm or at most 0.5 mm from the location at which the magnetic field |B| generated by the magnet 601 is zero in the absence of a ferromagnetic object.

Figure 6B:
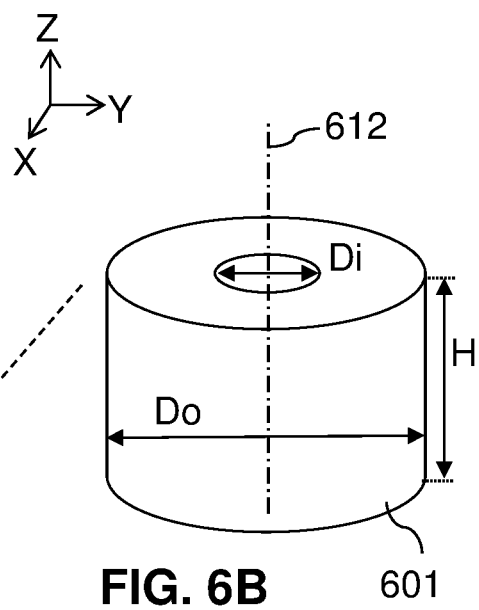
FIG. 6B shows the ring magnet in enlarged view.

FIG. 6B illustrates that the magnetic source 601 may be a single ring magnet having an outer diameter Do, and inner diameter Di and a height H. The outer diameter Do may be of value in the range from 8 to 12 mm, e.g. equal to about 10 mm. The inner diameter Di may be of value in the range from 2.0 to 5.0 mm, e.g. equal to about 3 mm. The height H may be a value of about 3.0 to about 5.0 mm, e.g. equal to about 4 mm. The value of d5 for a ring magnet with Do=about 10 mm, Di=about 3 mm, and H=about 4 mm may be a value in the range from about 0.2 mm to about 0.6 mm, e.g. equal to about 0.4 mm. As mentioned above, once the skilled person is told that a position along the Z-axis exists where the magnetic field generated by the magnet is zero, the skilled person can readily find this location for a magnet with other dimensions.

Figure 6C:
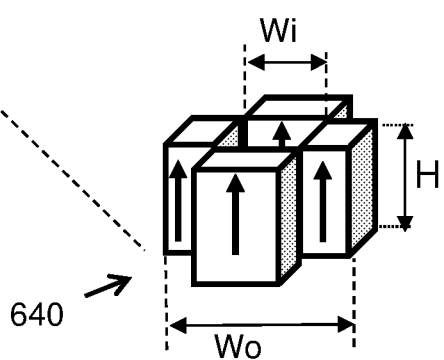
FIG. 6C shows a plurality of bar magnets oriented in parallel and arranged so as to form a central opening for creating a magnetic field similar to that of FIG. 4, as may be used in embodiments of the present invention.

But the present invention is not limited to assemblies comprising a ring magnet, and the same effect of creating a two-pole magnetic field with field lines that look similar to those of FIG. 4, (i.e. is circular symmetric around an axis, and is zero at a predefined distance from the magnet or magnetic structure) can also be obtained by a magnetic structure 640 comprising a plurality of bar magnets, e.g. as illustrated in FIG. 6C. The bar magnets are oriented in parallel and pointing in the same direction (in the example: upwards), and are arranged so as to form a central opening for creating a magnetic field with field lines similar to those of FIG. 4. The magnetic field created by these bar magnets will not be 100% circular symmetric, but 100% circular symmetry is not absolutely required. From this example, it can be understood that a cubical magnet with a cylindrical cut-out, or a prism-shape magnet (with a polygonal cross-section, e.g. hexagonal, octagonal, etc.) and with a central cut-out (circular, square, hexagonal, etc.) will also work.

Figure 7:
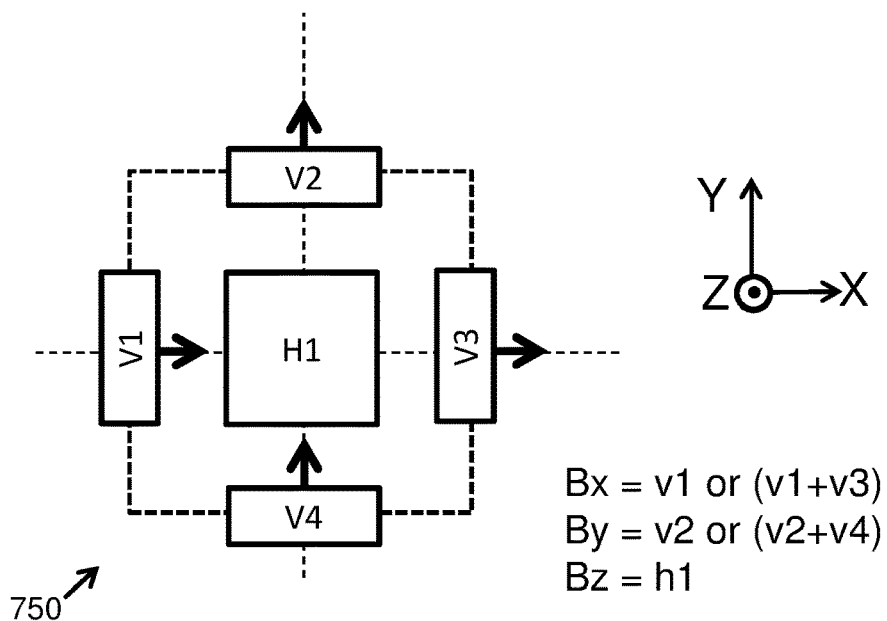
FIG. 7 shows a sensor structure comprising one horizontal Hall sensor and four vertical Hall sensors, as may be used in embodiments of the present invention, in which the orientation of the joystick is determined based on magnetic field components.

FIG. 7 shows a magnetic sensor structure which may be used in sensor device 130, 230, 330, 630, 1130, 1230, 1330, 1430 of sensor assemblies described herein. This magnetic sensor structure can be referred to as a 3D magnetic pixel. This sensor structure comprises one horizontal Hall element H1 and four vertical Hall sensors V1 to V4, all of which are preferably integrated in a semiconductor substrate. This magnetic sensor structure 750 is capable of measuring three orthogonal magnetic field components: Bx and By parallel to the semiconductor substrate, and Bz perpendicular to the semiconductor substrate. The horizontal Hall element H1 provides a signal h1, which is proportional to Bz. If the scaling factor is omitted from the equations, because the signals obtained from the Hall elements need to be scaled anyway, this can be expressed as: Bz=h1.

The signals v1 and v3 obtained from the vertical Hall elements V1 and V3 having an axis of highest sensitivity oriented in the X-direction, can be added or averaged, yielding the value of Bx. Again, if the scaling factor is omitted, we can write: Bx=(v1+v3). The sum of the signals v1 and v3 corresponds to the signal Bx of the magnetic field at the location of the horizontal Hall element H1, despite the fact that the vertical Hall elements are slightly displaced (but typically only about 25 to 45 μm). In fact, we could also write Bx=v1 (in which case V3 could be omitted), or Bx=v3 (in which case V1 could be omitted), but the sum (v1+v3) is a better indication of the value Bx at the same location as H1.

Similarly, the signals v2 and v4 obtained from the vertical Hall elements V2 and V4 having an axis of highest sensitivity oriented in the Y-direction, can be added or averaged, yielding the value of By. If the scaling factor is omitted, we can write: By=(v2+v4). In fact, we could also write By=v2 (in which case V4 could be omitted), or By=v4 (in which case V2 could be omitted), but the sum (v2+v4) is a better indication of the value By at the same location as H1, and has an improved signal-to-noise ratio (SNR).

Thus, in a variant (not shown) of FIG. 7, the structure only has H1, V1 and V2, and the sensor elements V3 and V4 are omitted. Such a structure is also capable of measuring three orthogonal magnetic field components Bx, By, Bz substantially at the location of H1, and has an improved signal-to-noise ratio (SNR).

The horizontal Hall element has a typically area of about 15 μm×15 μm to about 25 μm×25 μm, e.g. equal to about 20 μm×20 μm. The vertical Hall elements are arranged in close vicinity of the Horizontal Hall element H1. The entire structure of FIG. 7 is preferably smaller than 60 μm×60 μm.

The orientation of the stick can be derived from the values Bx, By, Bz of the magnetic field measured by the 3D pixel. For example, the angles α and β (as defined in FIG. 15) can be derived from a ratio of two or more of these values, e.g. as an arctangent of the ratio.

If the sensor structure 700 of FIG. 7 is used in a sensor assembly, e.g. the sensor assembly of FIG. 1, in which the stick is also movable in the Z-direction, the sensor device 130 can determine whether the stick is pressed (or not) by calculating a sum of squares of the three magnetic field components Bx, By, Bz, and by comparing this sum of squares with a predefined threshold. If the sum of squares is larger than the threshold, it means that the stick is pressed. If the sum of squares is smaller than the predefined threshold, it means that the stick is released, or vice versa. In fact, referring back to FIG. 4 and FIG. 5, in order to make sure that the sum of squares is clearly different in the "pressed state" and the "released state", it may be preferable to make sure that the sensor device is not located at a position on the Z-axis where the value of Bz is slightly positive, but to make sure that the value of Bz in the released state is equal to zero or slightly negative. This may help to clearly differentiate between the "pressed state" and the "released state". The predefined threshold value may for example be determined during design, or during a calibration procedure, and may be hardcoded, or may be written in a non-volatile memory (e.g. flash memory or eeprom) of the sensor device.

In embodiments where the stick can only be pressed when oriented in the neutral position, i.e. when Bx=0 and when By=0, the sensor device can simply compare the value of Bz with a predefined threshold value, and if the value of Bz is larger than the threshold, decide that the stick is pressed, and if the value of Bz is lower than the threshold, decide that the stick is released, or vice versa.

Figure 8:
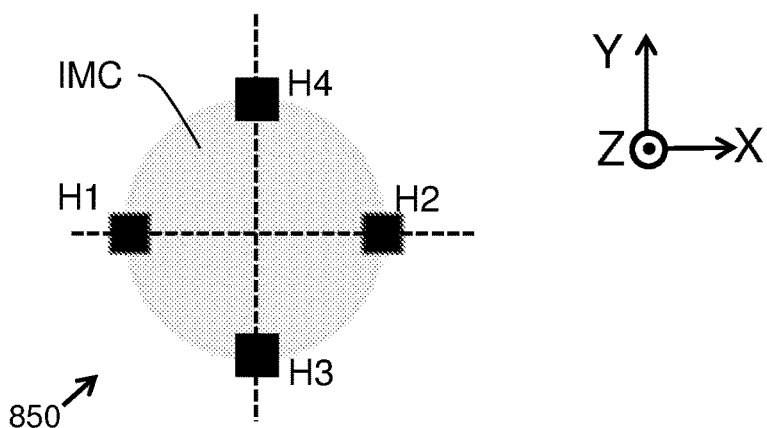
FIG. 8 shows a sensor structure comprising a disk shaped integrated magnetic concentrator (IMC) and four horizontal Hall elements arranged near the periphery of the disk, and angularly spaced in multiples of 90°, as may be used in embodiments of the present invention, in which the orientation of the joystick is determined based on magnetic field components.

FIG. 8 shows another magnetic sensor structure 850 which may be used in sensor device 130, 230, 330, 630, 1130, 1230, 1330, 1430 of sensor assemblies described herein. This structure 850 can also be referred to as a 3D magnetic pixel and can be seen as a variant of the structure 750 of FIG. 7, offering the same functionality. The sensor structure 850 of FIG. 8 comprises a circular disk shaped integrated magnetic concentrator (IMC) and four horizontal Hall elements H1 to H4 arranged near the periphery of the disk, and angularly spaced by multiples of 90°. If the scaling factor is omitted from the equations (as mentioned above), the value of Bx can be calculated as (h2−h1), the value of By can be calculated as (h4−h3), and the value of Bz can be calculated as (h1+h2) or as (h3+h4) or as (h1+h2+h3+h4). The latter value has an improved signal-to-noise ratio (SNR). The orientation of the stick can be derived from the values Bx, By, Bz of the magnetic field measured by the 3D pixel, preferably calculated as a function of a ratio of two or more of these values, e.g. as an arctangent function of the ratio, e.g. using the formulas shown in FIG. 15. In embodiments where the stick can only be pressed when oriented in the neutral position, i.e. when Bx=0 and when By=0, the sensor device can simply compare the value of Bz with a predefined threshold value, and if the value of Bz is larger than the threshold, decide that the stick is pressed, and if the value of Bz is lower than the threshold, decide that the stick is released, or vice versa.

FIG. 7 and FIG. 8 illustrate two examples of sensor structures 750, 850 that can be used to determine the orientation of the stick, and optionally also the axial position of the stick (i.e. whether the stick is pressed or released) based on one or more magnetic field components, but the present invention is not limited thereto, and it is also possible to determine said orientation based on magnetic field gradients, as will be described next.

Figure 9:
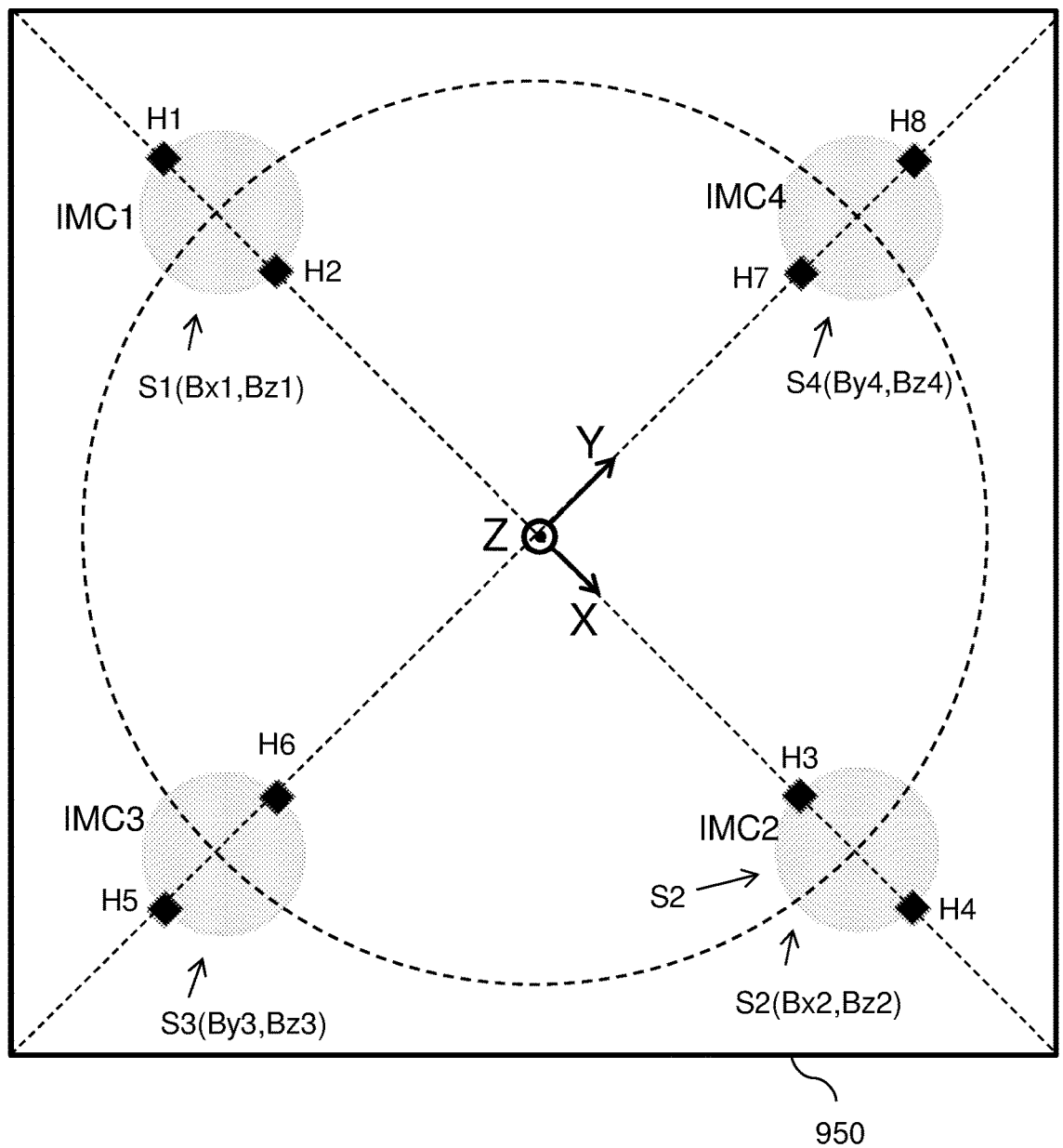
FIG. 9 shows a semiconductor substrate with four sensors, each sensor comprising an integrated magnetic concentrator disk and two horizontal Hall elements arranged on opposite sides of said disk, as may be used in embodiments of the present invention in which the orientation of the joystick is determined based on magnetic field gradients.

FIG. 9 shows another magnetic sensor structure 950 which may be used in sensor device 130, 230, 330, 630, 1130, 1230, 1330, 1430 of sensor assemblies described herein. This sensor structure 950 is preferably integrated in a semiconductor substrate, and comprises four sensors S1 to S4, each sensor being a 2D magnetic pixel, and comprising an integrated magnetic concentrator (IMC) disk and two horizontal Hall elements arranged on opposite sides of said disk, and located on either the X-axis or the Y-axis that passes through the center of the structure.

The sensor S1 provides two signals h1 and h2, for calculating Bx1 and Bz1.
The sensor S2 provides two signals h3 and h4, for calculating Bx2 and Bz2.
The sensor S3 provides two signals h5 and h6, for calculating By3 and Bz3.
The sensor S4 provides two signals h7 and h8, for calculating By4 and Bz4.

From the signals Bx1, Bz1, Bx2, Bz2 two magnetic field gradients can be determined, namely:

$$gr1=(dBx/dx)=Bx2-Bx1=(h4-h3)-(h2-h1)$$

$$gr2=(dBz/dx)=Bz2-Bz1=(h4+h3)-(h2+h1)$$

From the signals By3, Bz3, By4, Bz4 two magnetic field gradients can be determined, namely:

$$gr3=(dBy/dy)=By4-By3=(h8-h7)-(h6-h5)$$

$$gr4=(dBz/dy)=Bz4-Bz3=(h8+h7)-(h6+h5)$$

The orientation of the joystick can be determined as a function of these gradients, e.g. using the set of formulas:

$$\begin{cases} \alpha = K1 * \operatorname{atan2}(gr2, gr1) \text{ and} \\ \beta = K2 * \operatorname{atan2}(gr4, gr3), \end{cases}$$

where K1 and K2 are predefined constants, which may be determined by design, by simulation, or by calibration, which values may be hardcoded, or stored in a non-volatile memory (e.g. flash or eeprom) of the sensor device; or using the set of formulas:

$$\begin{cases} \alpha = K1 * \operatorname{atan2}(K3 * gr2, gr1) \text{ and} \\ \beta = K2 * \operatorname{atan2}(K4 * gr4, gr3), \end{cases}$$

where K1, K2, K3 and K4 are predefined constants, which may be determined by design, by simulation, or by calibration, which values may be hardcoded, or stored in a non-volatile memory of the sensor device.

It is an advantage of determining the orientation of the stick by means of magnetic field gradients (as opposed to magnetic field components), because the resulting angular values are largely independent of an external disturbance field.

Optionally the values of α and β thus calculated are further processed in a post-processing unit, for example to improve linearity, in manners which are known per se in the art, for example using a look-up table containing a plurality of reference points, and by interpolating (e.g. linearly interpolating) between these reference points.

Figure 10:
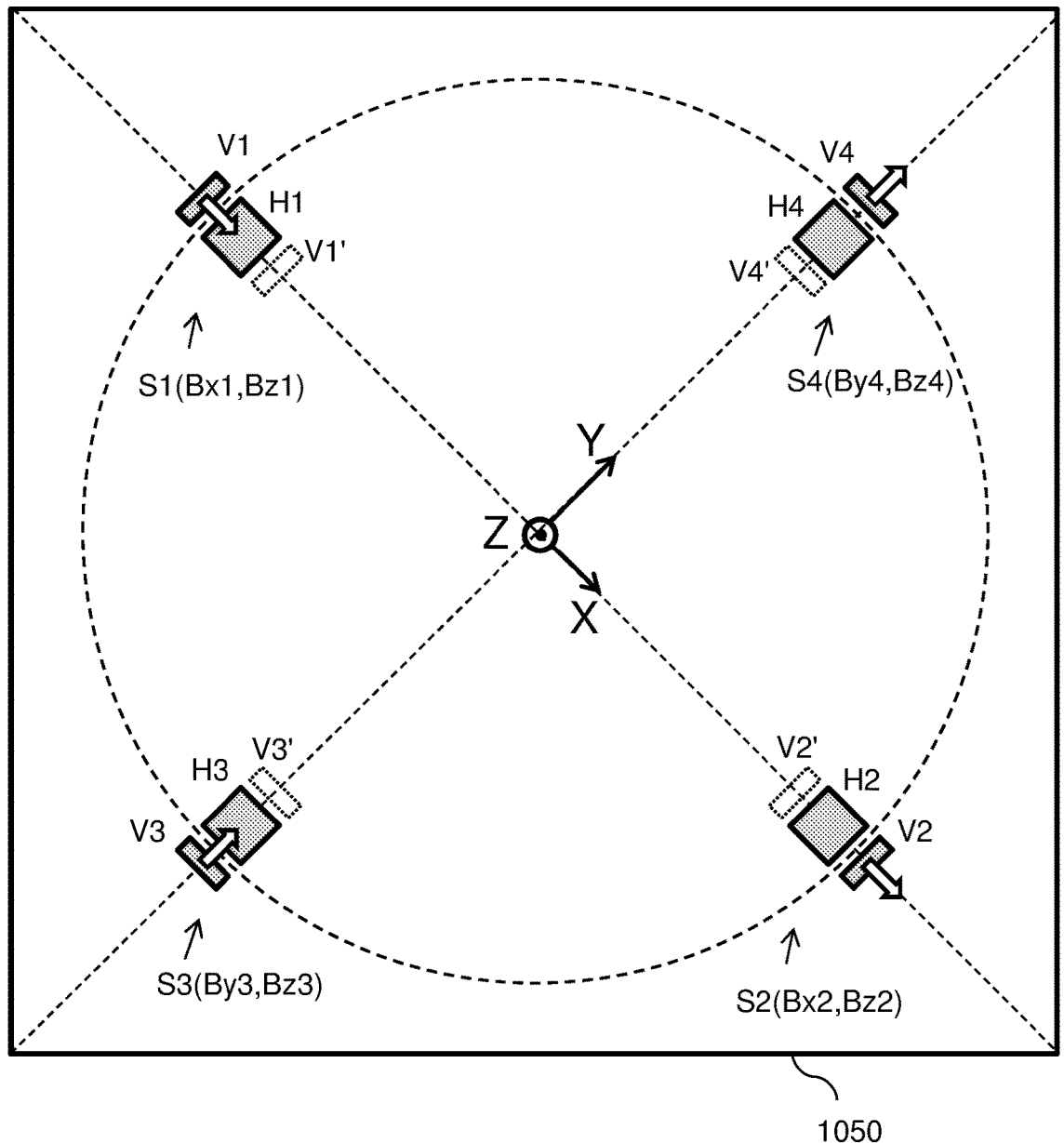
FIG. 10 shows a semiconductor substrate with four sensors, each sensor comprising a horizontal Hall element and one or two vertical Hall element, as may be used in embodiments of the present invention in which the orientation of the joystick is determined based on magnetic field gradients.

FIG. 10 shows another magnetic sensor structure 1050 which may be used in sensor device 130, 230, 330, 630, 1130, 1230, 1330, 1430 of sensor assemblies described herein. This sensor structure 1050 can be seen as a variant of the structure 950 of FIG. 9, offering the same functionality. The sensor structure of FIG. 10 comprises four sensors S1 to S4, each sensor being a 2D magnetic pixel, and comprising a horizontal Hall element and one vertical Hall element located adjacent the horizontal Hall element, or one horizontal Hall element and two vertical Hall elements located on opposite sides of the horizontal Hall element. Again, sensor S1 is capable of measuring (Bx1, Bz1), sensor S2 is capable of measuring (Bx2, Bz2), sensor S3 is capable of measuring (By3, Bz3) and sensor S4 is capable of measuring (By4, Bz4). From these eight magnetic field values four gradient values gr1, gr2, gr3, gr4 can be derived, using the formulas shown in FIG. 10. And from these four gradient values, two angular values can be calculated, preferably as a function of a ratio of gradient values, e.g. as an arctangent function of a ratio of magnetic field gradients.

Thus, in a variant of FIG. 10, each sensor S1 to S4 comprises two vertical Hall elements, and the signals from these vertical Hall elements are summed or averaged. For example, the value Bx1 may be calculated as (v1+v1'), Bx2=(v2+v2'), By3=(v3+v3') and Bz4=(v4+v4'). From these values four gradients can be determined, e.g. using the formulas:

$$gr1=(dBx/dx)=Bx2-Bx1=(v2+v2')-(v1+v1')$$

$$gr2=(dBz/dx)=Bz2-Bx1=(h2-h1)$$

$$gr3=(dBx/dy)=Bx4-Bx3=(v4+v4')-(v3+v3')$$

$$gr4=(dBz/dy)=Bz4-Bz3=(h4-h3)$$

and from these four gradients, two angles α and β can be calculated, e.g. using the same formulas as shown in FIG. 10.

In a variant, not explicitly shown, the sensor device has a 3D magnetic pixel as shown in FIG. 7 or FIG. 8, located at a central location, and furthermore has four 2D magnetic pixels S1 to S4 as shown in FIG. 9 or FIG. 10. This allows to calculate the angular position of the stick in two independent ways, and thus provides error detection capabilities. It also allows to detect whether the stick is pressed (or not), and it allows to determine the angles in a manner which is highly insensitive to an external disturbance field. And in case each of the 2D pixels has two vertical Hall elements instead of only one, the accuracy can be further improved by improving the signal-to-noise ratio (SNR) of the sensor signals.

FIG. 11A and FIG. 11B show an example of another joystick assembly 1100 in perspective view and in side view respectively. This assembly 1100 can be seen as a variant of the assembly 100 of FIG. 1 or as a variant of the assembly 200 of FIG. 2A to FIG. 2C.

The main differences between the assembly 1100 of FIG. 11A and the assembly 100 of FIG. 1 being that: (i) in the assembly 1100, the joystick 1102 can pivot about a (stationary) pivot point PP rather than a portion of the stick being in contact with the housing, and (ii) the ferromagnetic object 1105 has a ferromagnetic protrusion, which may be rounded or semi-spherical, connected to the stick and extending at its bottom side (facing the magnet 1101). The protrusion may be integrally formed with a larger ferromagnetic body, which in the example of FIG. 11 is a cylindrical body, but the invention would also work if the cylindrical body is non-ferromagnetic, e.g. made of plastic or aluminium. In this case, the rounded or semi-spherical object 1108 is in fact the ferromagnetic object. It may be connected to the stick and/or to the non-ferromagnetic body in any known manner, e.g. using glue, or using a screw thread.

In a variant, also illustrated by FIG. 11, but not shown separately to limit the number of Figures, the cylindrical object 1105 (which may be ferromagnetic or non-ferromagnetic) has a cavity 1107 for accommodating a ferromagnetic ball 1108 which is separate from the cylindrical object, and the housing further comprises a curved support surface 1109 for preventing that the ball contacts the semiconductor device. The ball may be arranged to roll over the curved surface 1109.

In another variant, also illustrated by FIG. 11, but not shown separately to limit the number of Figures, the cylindrical object 1105 (which may be ferromagnetic or non-ferromagnetic) has a cavity 1107 for accommodating a ferromagnetic ball 1108, but the ball 1108 is glued to the cylindrical object. In this case no curved support surface 1109 is required.

Most or everything else described above for FIG. 1 to FIG. 3C is also applicable here. For example: the magnetic source 1101 may be a ring magnet (e.g. an axially magnetized two-pole ring magnet), or a structure comprising a plurality of bar magnets (e.g. as shown in FIG. 6C). The magnetic source defines a "reference orientation" 1012, also referred to as "reference axis" Z; the sensor device 1130 is situated between the magnetic source 1101 and the ferromagnetic object 1108; if the ferromagnetic object 1108 is located on the reference axis and/or when the stick 1102 is oriented in the reference orientation, the potential energy of the magnetic system is minimal. If the stick 1102 is manually tilted away from this neutral position, the magnetic source 1101 will exert a force on the ferromagnetic object 1108 trying to move it back towards the reference axis.

The sensor device 1130 has a plurality of sensors, e.g. as described in FIG. 7 to FIG. 10, capable of measuring one or more magnetic field components and/or magnetic field gradients, from which the orientation of the stick 1102 can be calculated. The sensor device may be provided for outputting the measured values, or values derived therefrom, for example gradients, or a sum of squares, or a ratio, or a function of a ratio. The sensor device may comprise a processing circuit configured for determining, e.g. calculating one or two angles, e.g. a and f3 having the meaning illustrated in FIG. 15, or y and w having the meaning illustrated in FIG. 1.

If the stick 1102 is furthermore vertically movable, e.g. when the assembly comprises a housing (not shown in FIG. 11A) with a first housing portion which is stationary with respect to the magnet 1101, and with a second housing portion which is movable with respect to the magnet 1101, it is also possible to determine whether the stick (e.g. joystick or thumb stick) is being pressed. Such a housing may further comprise a membrane spring and a plurality of guiding pens, e.g. similar as in FIG. 1. The housing may further comprise a "ball and socket" joint for allowing the stick to pivot.

Figure 12:
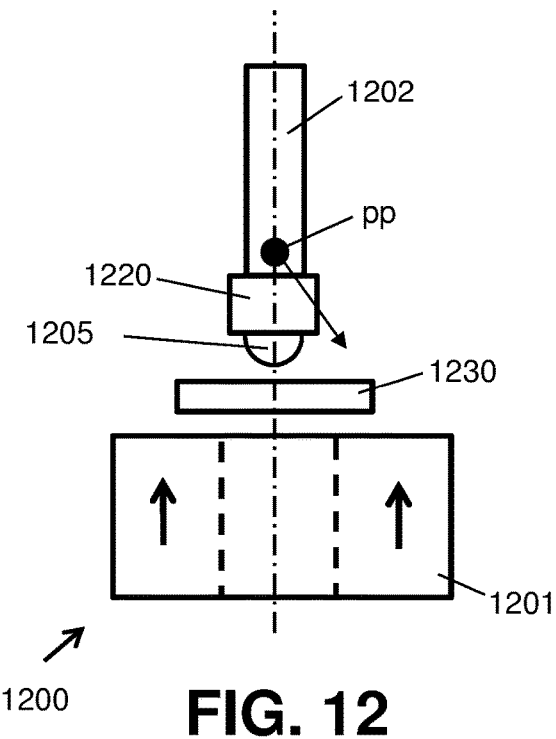
FIG. 12 shows another embodiment of the present invention, which can be seen as a variant of the joystick assembly of FIG. 11B, wherein the assembly comprises a ferromagnetic cube, and a ferromagnetic semi-sphere extending from the cube.

FIG. 12 shows another joystick assembly 1200, which can be seen as a variant of the joystick assembly 1100 of FIG. 11B, the main difference between that the assembly 1200 comprises a ferromagnetic or non-ferromagnetic cube 1220, and a ferromagnetic ball 1205 or semi-sphere or rounded object extending from the cube, or mounted to the cube (e.g. by gluing or using screw thread), or integrally formed with the cube. In the latter case, both the cube 1205 and the ball 1205 or sphere or partial sphere (e.g. semi-sphere) or rounded object comprise a ferromagnetic material. In the example shown in FIG. 12, the cube has a cross-section (in a plane perpendicular to the Z-axis) with a diagonal which is larger than the diameter of the ball or partial sphere, but that is not absolutely required.

In a variant of FIG. 12 (not shown), the diagonal of the cube 1220 in a cross section (in a plane perpendicular to the Z-axis) is smaller than diameter of the ball 1205.

In yet another variant of FIG. 12, the ferromagnetic or non-ferromagnetic object 1220 is a cylinder having a diameter larger or smaller than the stick 1202.

Figure 13:
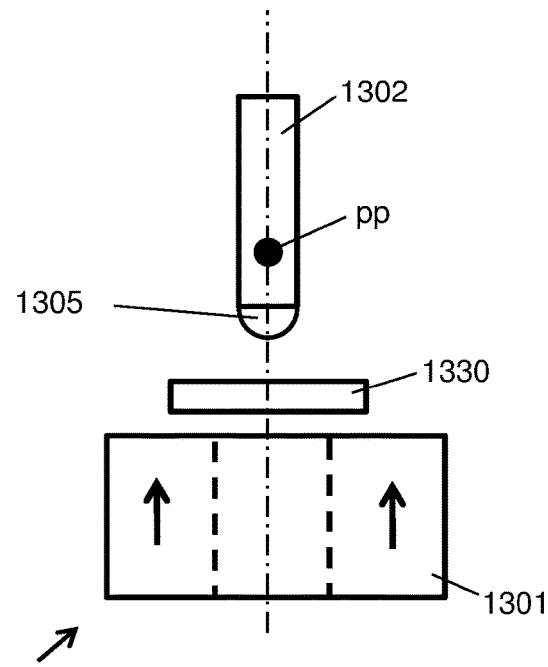
FIG. 13 shows another embodiment of the present invention, which can be seen as a variant of the joystick assembly of FIG. 12, wherein the assembly comprises a cylindrical stick, and a ferromagnetic semi-sphere mounted at an end of the stick.

FIG. 13 shows another joystick assembly 1300, which can be seen as another variant of the joystick assembly 1200 of FIG. 12, wherein the assembly comprises a cylindrical stick, and a ferromagnetic object in the form of a semi-sphere mounted at an end of the stick, but without a cube. In the embodiment of FIG. 13, the semi-sphere has a diameter substantially equal to the diameter of the stick 1302.

Figure 14:
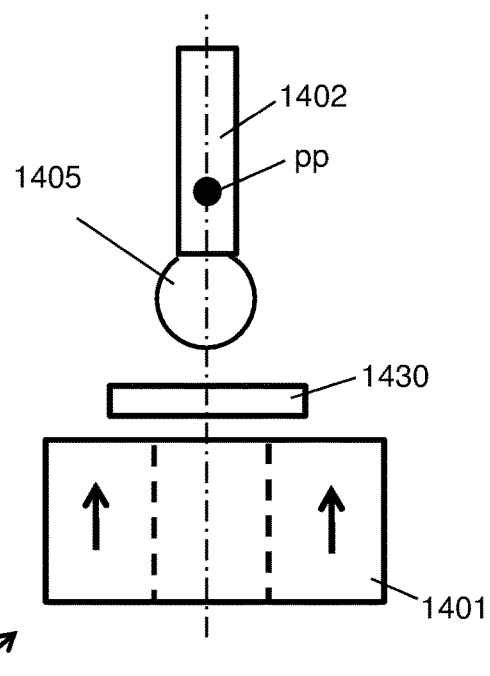
FIG. 14 shows another embodiment of the present invention, which can be seen as a variant of the joystick assembly of FIG. 13, wherein the assembly comprises a cylindrical stick, preferably made out of plastic, and a ferromagnetic ball or overall spherical shape mounted at an end of the stick.

FIG. 14 shows a joystick assembly 1400 which is a variant of FIG. 13, wherein the ferromagnetic object 1405 is a ball or has an overall spherical shape, which is directly connected to the stick, e.g. using glue or a screw thread or the like. The diameter of the ball is larger than a cross-sectional diameter of the cylindrical stick 1402, for example at least 20% larger. The stick 1402 may comprise a ferromagnetic material but is preferably made of a plastic material.

FIG. 15 shows a way of defining the orientation of a vector of a constant length [CP] starting from the reference point "C" and ending at a point "P" on an imaginary sphere. The vector [CP] is not shown, but a first orthogonal projection [CA] of the vector [CP] onto the plane XZ is shown, and a second orthogonal projection [CB] of the vector [CP] onto the plane YZ is shown. The orientation of an axis A passing through the points C and P can also be defined by a first angle α between the positive X-axis and the vector [CA], and by a second angle β between the positive Y-axis and the vector [CB]. As an example, if the magnet axis is oriented perpendicular to the plane XY (i.e. perpendicular to the semiconductor substrate), also referred to as the "neutral position", α=90° and β=90°. This corresponds to the orientation in which φ=0° and ψ=0°, described above.

The following formulas apply:

$$Bx = B*\cos(\alpha)*\sin(\beta) \quad [1]$$

$$By = B*\cos(\beta)*\sin(\alpha) \quad [2]$$

$$Bz = B*\sin(\beta)*\sin(\alpha) \quad [3]$$

Division of [3] and [1] yields:

$$(Bz/Bx) = \tan(\alpha) \quad [4]$$

$$(Bz/By) = \tan(\beta) \quad [5]$$

where Bx is the magnetic field component oriented in the X-direction, By is the magnetic field component oriented in the Y-direction, Bz is the magnetic field component oriented in the Z-direction, and B is the magnitude of the magnetic field vector.

In preferred embodiments, the angles α and β are values in the range from 90°±30°, or in the range from 90°±40°, or in the range from 90°±50°, or in the range from 90°±60°.

The invention claimed is:

1. A sensor assembly comprising:
a magnetic source for generating a magnetic field with circular symmetry or with rotational symmetry about a central axis defining a reference orientation;
a lever or a stick which is mounted such that the lever or stick can be tilted with respect to said reference orientation, the lever or stick comprising or being fixedly connected to a ferromagnetic object;
a magnetic sensor device comprising a substrate with a plurality of magnetic sensors configured for providing sensor signals indicative of the magnetic field;
wherein the magnetic sensor device is located between the magnetic source and the ferromagnetic object; and
wherein the lever or stick is mounted in such a way that a potential energy of the magnetic field is minimal when the lever or stick is oriented in the reference orientation;
wherein the sensor assembly comprises only a single magnet;
wherein the magnetic source is an axially magnetized magnet with a through-opening oriented in the axial direction.

2. The sensor assembly according to claim 1, wherein the magnetic sensor device is situated such that its sensor elements are located substantially on the central axis of the magnetic source, and at an axial position where the axial magnetic field component is equal to zero, or at a distance smaller than 1.0 mm, or smaller than 0.8 mm, or 0.5 mm from that axial position.

3. The sensor assembly according to claim 1,
wherein the ferromagnetic object has a cavity facing the magnetic source; or
wherein the ferromagnetic object has a rounded shape or has a shape with a ferromagnetic protrusion extending toward the magnetic source.

4. The sensor assembly according to claim 1, wherein the assembly further comprises a housing or a holding mechanism providing the movable mounting of the lever or stick and the ferromagnetic object relative to the magnetic source.

5. The sensor assembly according to claim 4,
wherein the ferromagnetic object has a shape with a peripheral flange directed towards the magnetic source; and
wherein the housing or holding mechanism further comprises a contact surface portion for supporting said peripheral flange.

6. The sensor assembly according to claim 4, wherein the housing or holding mechanism comprises a first housing portion which is fixed relative to the magnetic source, and a second housing portion which is movable relative to the magnetic source.

7. The sensor assembly according to claim 1, wherein the ferromagnetic object is pivotable about a pivot point.

8. The sensor assembly according to claim 1, wherein the sensor device is configured for determining at least two magnetic field components oriented in at least two orthogonal directions, and for determining at least one tilt angle based on these magnetic field components; or
wherein the sensor device is configured for determining at least three magnetic field components oriented in three orthogonal directions, and for determining one or two tilt angles based on these magnetic field components.

9. The sensor assembly according to claim 8, wherein the sensor device is further configured for determining a sum of squares of the at least two magnetic field components, and
for comparing this sum or a value derived therefrom with a predefined threshold, and
for determining that the stick is pushed or pressed when the sum or the value derived therefrom is larger than said threshold, and
for determining that the stick is released when the sum or the value derived therefrom is smaller than said threshold.

10. The sensor assembly according to claim 8, wherein the sensor device is further configured for determining a sum of squares of the three magnetic field components, and
for comparing this sum or a value derived therefrom with a predefined threshold, and
for determining that the stick is pushed or pressed when the sum or the value derived therefrom is larger than said threshold, and
for determining that the stick is released when the sum or the value derived therefrom is smaller than said threshold.

11. The sensor assembly according to claim 1, wherein the sensor device is configured for determining two or four magnetic field gradients oriented in different directions, and for determining one or two tilt angles based on these magnetic field gradients.

12. The sensor assembly according to claim 1, wherein the sensor device comprises at least one horizontal Hall element for measuring a first magnetic field component in a first direction parallel to the reference orientation, and comprises at least one vertical Hall elements for measuring a second magnetic field component oriented in a second direction perpendicular to the first direction, and optionally comprises at least one vertical Hall element for measuring a third magnetic field component oriented in a third direction perpendicular to the first and the second direction.

13. The sensor assembly according to claim 1, wherein the sensor device comprises an integrated magnetic flux concentrator (IMC) having a circular shape, and at least two horizontal Hall elements located near a periphery of the IMC and angularly spaced by 180°, or at least three horizontal Hall elements located near a periphery of the IMC and angularly spaced by multiples of 120°, or at least four horizontal Hall elements located near a periphery of the IMC and angularly spaced by multiples of 90°.

14. The sensor assembly according to claim 1, wherein the plurality of magnetic sensors comprises a first sensor, a second sensor, a third sensor and a fourth sensor, the first sensor being located at a first sensor location and the second sensor being located at a second sensor location, situated on a first virtual line oriented in a first direction, and spaced apart from each other by a first distance, the first sensor being configured for measuring a first magnetic field component oriented in the first direction and a second magnetic field component oriented in a third direction, the second sensor being configured for measuring a third magnetic field component oriented in the first direction and a fourth magnetic field component oriented in the third direction, the third sensor being located at a third sensor location and the fourth sensor being located at a fourth sensor location, situated on a second virtual line oriented in a second direction, and spaced apart from each other by a second distance, the third sensor being configured for measuring a fifth magnetic field component oriented in the second direction and a sixth magnetic field component oriented in the third direction, the fourth sensor being configured for measuring a seventh magnetic field component oriented in the second direction and an eighth magnetic field component oriented in the third direction.

15. The sensor assembly according to claim 1,
wherein the sensor device is configured for determining a first angle using a function of a ratio of a first magnetic field component oriented perpendicular to the substrate and a second magnetic field component oriented parallel to the substrate; and
optionally wherein the sensor device is further configured for determining a second angle using a function of a ratio of the first magnetic field component and a third magnetic field component oriented parallel to the substrate and perpendicular to the second magnetic field component (By).

16. The sensor assembly according to claim 1,
wherein the sensor device is configured for determining a first angle using an arctangent function of a ratio of a first magnetic field gradient and a second magnetic field gradient; and
optionally wherein the sensor device is configured for determining a second angle using an arctangent function of a ratio of a third magnetic field gradient and a fourth magnetic field gradient.

17. The sensor assembly according to claim 1, wherein the magnetic source is a ring magnet having an outer diameter in the range from 8 to 12 mm, an inner diameter in the range from 2.0 to 5.0 mm, and a height of about 3.0 to about 5.0 mm.

18. The sensor assembly according to claim 17, wherein the sensor device comprises a semiconductor substrate, which is situated at a distance in the range from 0.2 mm to 0.8 mm from the ring magnet.

* * * * *